United States Patent
Nakayama (10) Patent No.: US 7,477,783 B2
(45) Date of Patent: Jan. 13, 2009

(54) IMAGE PROCESSING TERMINAL APPARATUS, SYSTEM AND METHOD

(76) Inventor: Mitsuo Nakayama, 4-13-3, Shibaura, Minato-ku, Tokyo 108-0023 (JP)

( * ) Notice: Subject to any disclaimer, the term of this patent is extended or adjusted under 35 U.S.C. 154(b) by 940 days.

(21) Appl. No.: 10/824,906

(22) Filed: Apr. 15, 2004

(65) Prior Publication Data
US 2004/0208369 A1 Oct. 21, 2004

(30) Foreign Application Priority Data

Apr. 18, 2003 (JP) ............................. 2003-113750
Apr. 14, 2004 (JP) ............................. 2004-118906

(51) Int. Cl.
G06K 9/34 (2006.01)
G06K 9/18 (2006.01)

(52) U.S. Cl. ........................ 382/173; 382/182; 382/321

(58) Field of Classification Search ................. 382/182, 382/173
See application file for complete search history.

(56) References Cited

U.S. PATENT DOCUMENTS

| | | | |
|---|---|---|---|
| 4,804,949 A * | 2/1989 | Faulkerson | 345/166 |
| 5,663,552 A * | 9/1997 | Komizo | 235/472.01 |
| 6,927,774 B2 * | 8/2005 | Yano | 345/469 |
| 2003/0020814 A1 * | 1/2003 | Ono | 348/220.1 |

FOREIGN PATENT DOCUMENTS

| | | |
|---|---|---|
| JP | 7-220025 | 8/1995 |
| JP | 10-294855 | 11/1998 |
| JP | 2000-99709 | 4/2000 |
| JP | 2001-358916 | 12/2001 |
| JP | 2002-352190 | 12/2002 |
| JP | 2002352190 A * | 12/2002 |
| JP | 2003-87544 | 3/2003 |
| JP | 2003087544 A * | 3/2003 |

* cited by examiner

*Primary Examiner*—Samir A Ahmed
*Assistant Examiner*—Michael Vanchy, Jr.
(74) *Attorney, Agent, or Firm*—Cook Alex Ltd.

(57) ABSTRACT

An image processing terminal apparatus includes an image capture device configured to optically scan an intended area on a document by moving the terminal apparatus over the document and to capture image data of each of serial static images of the intended area for position calculation and image data of each of serial static images of the intended area for character recognition, alternately, and an image process device configured to calculate position information of the each of serial static images of the intended area for character recognition based on image data of predetermined areas in the each of serial static images of the intended area for position calculation.

7 Claims, 7 Drawing Sheets

IMAGE PROCESSING TERMINAL APPARATUS, SYSTEM AND METHOD

The present application claims priority and contains subject matter related to Japanese Patent Application Nos. 2003-113750 and 2004-118906 filed in the Japanese Patent Office on Apr. 18, 2003 and Apr. 14, 2004, respectively, the entire contents of each of which are hereby incorporated herein by reference.

BACKGROUND OF THE INVENTION

1. Field of the Invention

The present invention relates to an image processing terminal apparatus, an image processing system and an image processing method, and in particular relates to a terminal apparatus having an image input device and capturing image data of an intended area on a document by scanning the intended area on the document, an image processing system including the terminal apparatus, and an image processing method in the image processing system.

2. Discussion of the Background

An optical character recognition apparatus using a PC and a flatbed or sheet-feed scanner (hereinafter referred to as a scanner) is generally operated as follows in performing character recognition to an image on a printed document (hereinafter simply referred to as a document);

First, the document is set on the scanner, and the entire part of the image on the document is scanned with the scanner and thereby image data of the image on the document is captured and transferred to the PC.

Secondly, the image data of the image is displayed on a display of the PC with character recognition software. An area in the image to which character recognition is desired to be performed (hereinafter referred to as an intended area) is designated with a mouse using the character recognition software, and thereafter with manipulation of the character recognition software, image data of the intended area designated in the image is converted to text data (character code data), and the text data of the intended area is displayed on the display again.

Thirdly, the recognition result with the character recognition software (i.e., the text data of the intended area) is checked, and a necessary correction is made to the text data of the intended area using a keyboard of the PC.

Fourthly, the text data of the intended area after correction is copied or pasted to application software having a word processing function or a spreadsheet function.

When processing plural images, the above-described operations are performed to each of the images. When plural intended areas are included in an image, the above-described second through the fourth operations are performed to each of the intended areas.

When an image on a document is scanned with a flatbed canner for example, if an image sensor of the flatbed scanner is vibrated or moved, obtained image data is distorted. Therefore, generally, the flatbed scanner is provided with guide rails to prevent the image sensor from being vibrated or moved.

Also, a portable image scanner suitable for capturing image data of a necessary part of an image on a document and performing character recognition to the image data is known. In such a portable image scanner, because an area of a light receiving part of a scanning device is smaller relative to a size of a document, generally an intended area of the image on the document cannot be scanned at one time. In this case, the portable image scanner must be moved laterally several times to obtain image data of the entire part of the intended area. Further, when the portable image scanner is restricted in the moving direction, in capturing image data of an image on a document in which text is vertically written, the user may have to hold the image scanner differently from when capturing image data of an image on a document in which text is laterally written. Furthermore, the portable image scanner easily moves or vibrates, thereby distortion being caused in captured image data, so that when character recognition is performed to the image data, the correct character recognition ratio is decreased.

International Patent Publication WO00/26851 describes a portable image scanner and an optical character recognition apparatus in which image data captured by scanning an intended area on a document with the image scanner is converted to text data with character recognition software in a PC and is directly inputted to application software. The publication also describes that designation of an input start position of the intended area and confirmation of the designation can be made on an LCD of the portable scanner.

International Patent Publication WO007/73981 describes a portable character recognition apparatus in which vibrating of the apparatus is suppressed by using a special paper and thereby distortion is prevented from being caused in captured image data. However, in this case, character recognition can be only performed relative to images printed on the special paper.

A known portable scanner uses a guide roller to prevent winding. Mechanical countermeasures for preventing winding of a portable scanner such as a guide roller easily break while in use and have disadvantages in strength and reliability.

Japanese Patent Laid-open publication 09-282084 describes a technology of correcting a rotation angle of image data of a figure by providing, separately from a line sensor for capturing the image data of the figure, a plurality of pairs of a light emitting element and a light receiving element for detecting a moving distance of the figure and correcting distortion in the image data of the figure. In this case, the number of parts of an apparatus incorporating the technology is relatively large so that the apparatus is expensive, and further adjustment of the apparatus in initial setting, etc, is necessary.

U.S. Pat. No. 6,563,951 describes a method of performing a pattern matching process between adjacent images. In the method, the sizes of characters that can be processed are limited to 7-20 points, and characters of larger sizes and relatively large images cannot be processed.

SUMMARY OF THE INVENTION

The present invention has been made in view of the above-discussed and other problems and addresses the above-discussed and other problems.

Preferred embodiments of the present invention provide a novel image processing terminal apparatus that enables capturing image data of an intended area on a document in a reliable manner without having distortion in captured image data, which is generally caused by movement of the apparatus in scanning the document, at relatively low cost.

The preferred embodiments of the present invention further provide a novel image processing system including the terminal apparatus having an image capture device and a novel image processing method therefore that enable performing reliable character recognition to an intended area on a document by capturing image data of the intended area with the terminal apparatus without having distortion in captured image data, which is generally caused by movement of the terminal apparatus in scanning the document, and that enable inputting a result of the character recognition to a desired location on application software being operated on a PC connected with the terminal apparatus or to an apparatus communicating with the terminal apparatus via a network.

According to a preferred embodiment of the present invention, an image processing terminal apparatus includes an image capture device configured to optically scan an intended area on a document by moving the terminal apparatus over the document and to capture image data of each of serial static images of the intended area for position calculation and image data of each of serial static images of the intended area for character recognition, alternately, and an image process device configured to calculate position information of the each of serial static images of the intended area for character recognition based on image data of predetermined areas in the each of serial static images of the intended area for position calculation.

In the image processing terminal apparatus, the image process device may be configured to calculate the position information of the each of serial static images of the intended area for character recognition based on image data of at least two predetermined areas in the each of serial static images of the intended area for position calculation.

Further, in the image processing terminal apparatus, the image data of the each of serial static images of the intended area for position calculation and the image data of the each of serial static images of the intended area for character recognition may be captured at different resolutions.

Furthermore, in the image processing terminal apparatus, the image capture device may be configured to emit light in a direction substantially parallel to a surface of the document when capturing the image data of the each of serial static images of the intended area for position calculation and to emit light in a direction substantially perpendicular to the surface of the document when capturing the image data of each of serial static images of the intended area for character recognition.

According to another preferred embodiment of the present invention, an image processing system includes a terminal apparatus and a computer connected with the terminal apparatus. The terminal apparatus includes an image capture device configured to optically scan an intended area on a document by moving the terminal apparatus over the document and to capture image data of each of serial static images of the intended area for position calculation and image data of each of serial static images of the intended area for character recognition, alternately, and an image process device configured to calculate position information of the each of serial static images of the intended area for character recognition based on image data of predetermined areas in the each of serial static images of the intended area for position calculation. The computer serially joins the image data of the each of serial static images of the intended area for character recognition with each other based upon the position information of the each of serial static images of the intended area for character recognition to generate image data of the intended area.

In the above-described image processing system, the computer may perform character recognition to the image data of the intended area. Further, the terminal apparatus may be configured to function as a pointing device to the computer.

According to still another preferred embodiment of the present invention, an image processing network system includes the Internet, an image processing terminal apparatus connected with the Internet, and a server connected with the Internet. The image processing terminal apparatus includes an image capture device configured to optically scan an intended area on a document by moving the terminal apparatus over the document and to capture image data of each of serial static images of the intended area for position calculation and image data of each of serial static images of the intended area for character recognition, alternately, and an image process device configured to calculate position information of the each of serial static images of the intended area for character recognition based on image data of predetermined areas in the each of serial static images of the intended area for position calculation. The image processing terminal apparatus transmits the image data of the each of serial static images of the intended area for character recognition together with the position information of the each of serial static images of the intended area for character recognition to the server via the Internet, and the server serially joins the image data of the each of serial static images of the intended area for character recognition with each other based on the image data of the each of serial static images of the intended area for character recognition to generate image data of the intended area, performs character recognition to the image data of the intended area, and transmits a result of the character recognition to the image processing terminal apparatus.

In the above-described image processing network system, the image processing terminal apparatus may be a mobile phone connected with the Internet via a wireless public switched circuit.

According to still another preferred embodiment of the present invention, a method of image processing in an image processing system includes scanning an intended area on a document and capturing image data of each of serial static images of the intended area for position calculation and image data of each of serial static images of the intended area for character recognition, alternately, with an image capture device of a terminal apparatus of the system by moving the terminal apparatus over the document, and calculating position information of the each of serial static images of the intended area for character recognition based on image data of at least two predetermined areas in the each of the serial static images of the intended area for position calculation with an image process device of the terminal apparatus.

In the method, the image data of the each of serial static images of the intended area for position calculation and the image data of the each of serial static images of the intended area for character recognition may be captured at different resolutions.

Further, in the method, the image capture device may emit light in a direction substantially parallel to a surface of the document when capturing the image data of the each of serial static images of the intended area for position calculation and light in a direction substantially perpendicular to the surface of the document when capturing the image data of each of serial static images of the intended area for character recognition.

Furthermore, the method may include serially joining the image data of the each of serial static images of the intended area for character recognition with each other with an image synthesis device of the terminal apparatus based on the position information of the each of serial static images of the intended area for character recognition to generate image data of the intended area.

BRIEF DESCRIPTION OF THE DRAWINGS

A more complete appreciation and understanding of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

In the following description, the term "character recognition" not only refers to recognition of characters such as Japanese kana and kanji characters and alphanumeric characters but also to recognition of images and symbols such as bar codes that can be recognized and converted to character code data by a computer.

Figure 1:
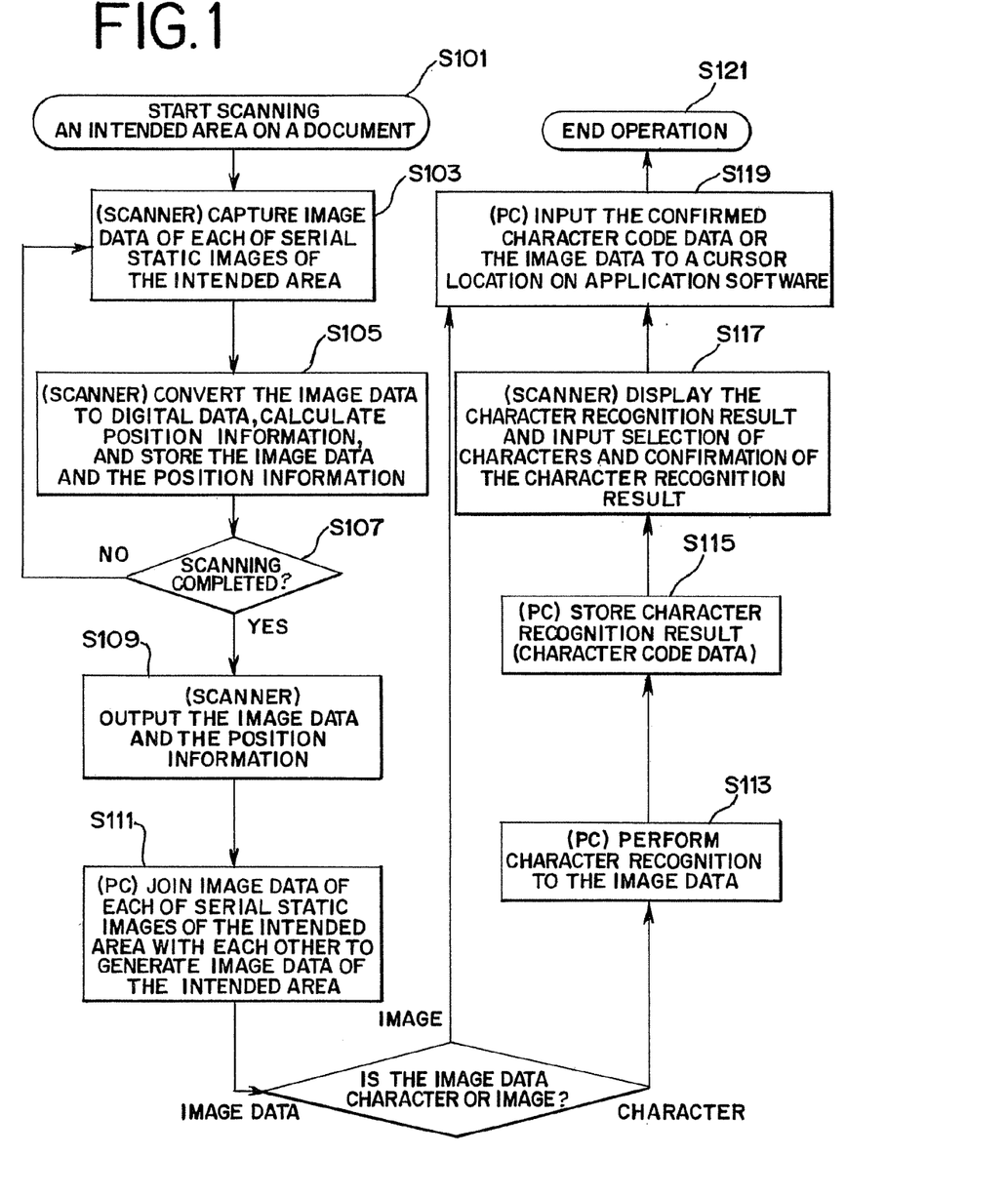
FIG. 1 is a flowchart of an operation of image processing in an image processing system, according to a preferred embodiment of the present invention.

FIG. 1 is a flowchart of an operation of image processing in an image processing system including a terminal apparatus and a PC, according to a preferred embodiment of the present invention.

First, scanning of an intended area on a document is started with a portable scanner as the terminal apparatus by moving the portable scanner over the document (S101). Image data of each of serial static images of the intended area for calculation of position information of each of serial static images of the intended area for character recognition (hereinafter sometimes referred to as "image data for position calculation") and image data of each of serial static images of the intended area for character recognition (hereinafter sometimes referred to as "image data for character recognition") are alternately captured with an electronic shutter and an image sensor of the portable scanner, the image data for position calculation and the image data for character recognition are converted to digital data, and image data of two predetermined areas in each of serial static images of the intended area for position calculations is sent to an image process device of the portable scanner (S103).

Position information (i.e., position coordinates and a rotation angle) of each of serial static images for character recognition is calculated based on image data for position calculation (as described later) with the image process device, and the image data for character recognition is temporarily stored together with the position information in a memory of the portable scanner (S105). When the scanning of the intended area has ended, the stored image data of each of serial static images for character recognition is transmitted to a PC together with the position information via an output part of the portable scanner (S107-S109). The image data of each of serial static images of the intended area for character recognition is joined with each other based on the position information (the position coordinates and the rotation angle) of the each of serial static images for character recognition with the PC, and thereby image data of the intended area on the document is generated (S111). In joining the image data of each of serial static images of the intended area for character recognition with each other, the relative positioning and the rotation angle of the each of serial static images for character recognition are determined based on the position information thereof and the portion of the each of serial static images for character recognition overlapped with an adjacent static image is eliminated, so that image data truthfully representing an image of the intended area is generated, without having distortion which is generally caused by movement of the portable scanner in scanning.

Thereafter, when the intended area on the document is an area of images such as photographs, etc. to which character recognition is not desired, the generated image data of the intended area is automatically or directly inputted to a cursor location on application software being operated on the PC (S119), and thereby the operation ends (S121).

When the intended area is an area of characters to which the user desires to perform character recognition, the character recognition is performed to the image data of the intended area with character recognition software installed in the PC so that the image data of the intended area is automatically converted to character code data (S113), and the character code data is temporarily stored in a memory of the PC (S115). Subsequently, the recognition result of the image data of the intended area (the character code data) is displayed on a display of the portable scanner, and the user inputs selection of desired characters in displayed candidate characters as necessary and confirmation of the recognition result (S117). Then, the confirmed character code data is automatically or directly inputted to a cursor location on the application software being operated on the PC (S119), and thereby the operation ends (S121).

Figure 2:
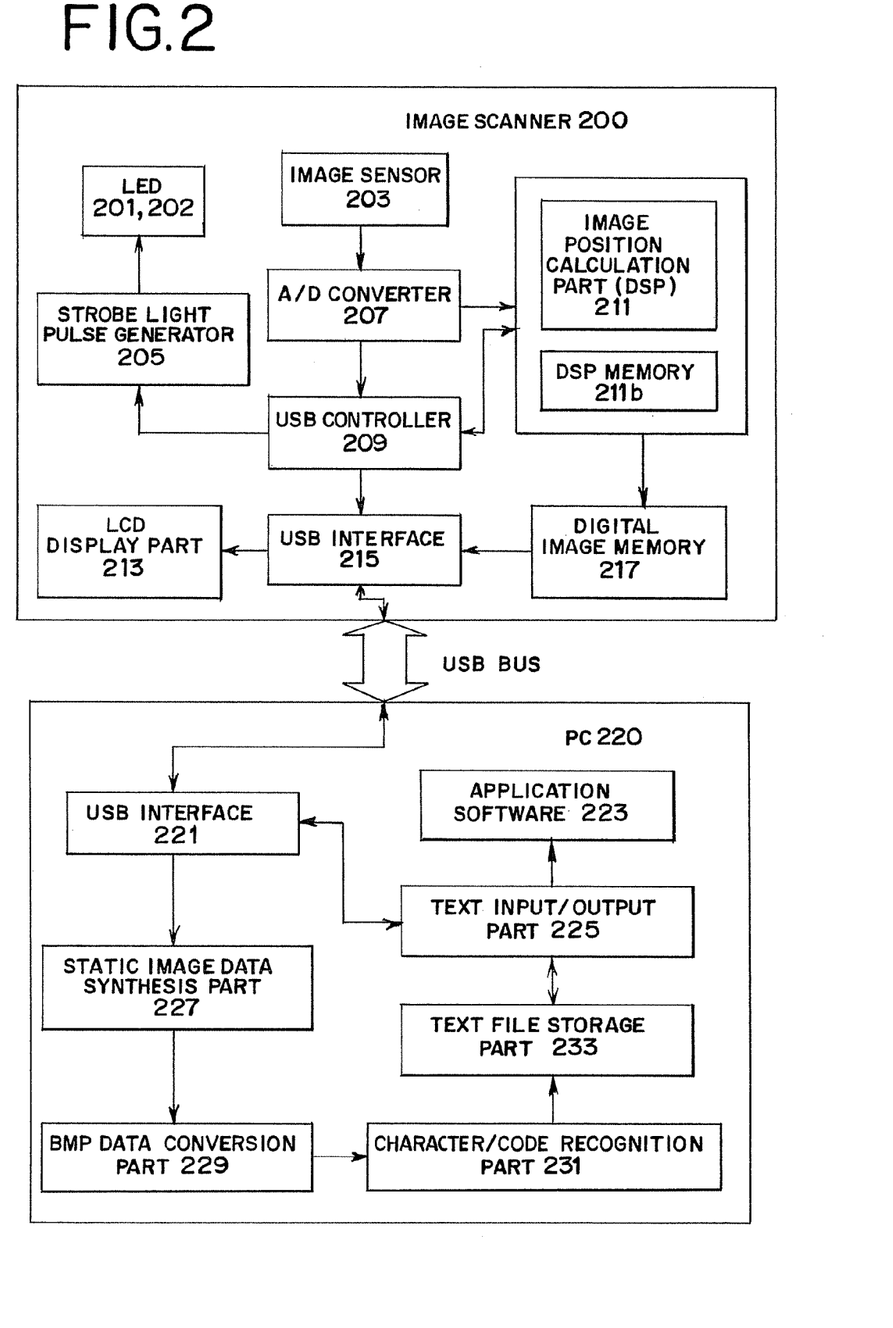
FIG. 2 is a system block diagram of an image processing system including an image scanner as a terminal apparatus and a PC, according to a preferred embodiment of the present invention.

FIG. 2 illustrates a configuration of an image processing system including a terminal apparatus and a PC according to a preferred embodiment of the present invention. An image scanner 200 as the terminal apparatus is configured to move over a document to optically scan an intended area on the document to capture image data of the intended area. The image scanner 200 includes an LED 201 serving as a strobe light that is configured to emit light in a direction substantially parallel to a surface of a document to capture image data for position calculation, an LED 202 configured to emit light in a direction substantially perpendicular to a surface of a document to capture image data for character recognition, an image sensor 203 as an image capture device of the present invention, and a strobe light pulse generator 205. The image scanner 200 further includes an A/D converter 207, a USB controller 209, an image position calculation part (DSP) 211 as an image process device of the present invention, an LCD display part 213, a USB interface 215 as an input device and an output device of the present invention, and a digital image memory 217.

The USB interface 215 includes an output part configured to output image data captured with the image sensor 203 and processed with the image position calculation part 211 to a PC 220 and an input part configured to input a result of character recognition of the image data from the PC 220.

The LCD display part 213 is configured to display the result of character recognition received from the PC 220. The image scanner 200 further includes an operation part (not shown) with which the user inputs selection of desired characters in candidate characters and confirmation of the result of character recognition being displayed on the LCD display part 213.

The image scanner 200 is configured to move over a document so that the user can arbitrarily designate an area on the document to which the user desires to perform character recognition. Further, the image scanner 200 is configured to display a result of performing character recognition to the designated area on the document on the LCD display part 213 as described above, so that the user can confirm the result of the character recognition at the image scanner 200. Furthermore, when confirmation of the result of character recognition has been inputted with the operation part of the image scanner 200, the image scanner 200 so notifies the PC 220.

The PC 220 includes application software 223 such as word processing software, spreadsheet software or database software, and character recognition software in a character/code recognition part 231 to perform character recognition to image data outputted from the output part of the image scanner 200. The PC 220 is configured to perform, when image data captured and processed with the image scanner 200 has been inputted to the PC 220, character recognition to the inputted image data with the character recognition software, and to transmit a result of the character recognition to the image scanner 200.

The PC 220 is configured to input, when confirmation of the result of the character recognition (character code data) has been inputted with the image scanner 200, the confirmed character code data to a cursor location on the application software being operated on the PC 220.

When an intended area on a document is scanned with the above-described image scanner 200 by moving the image scanner 200 over the document, image data captured and processed with the image scanner 200 is transmitted to the PC 220.

The image data received by the PC 220 is converted to character code data with the character recognition software being operated in the background of the application software 223 for inputting data, and the character code data is transmitted to the image scanner 200. The image scanner 200 displays the received character code data on the LCD display part 213, and with a confirmation operation with the operation part of the image scanner 200 relative to the character code data displayed on the LCD displayed part 213, the image scanner 200 informs the PC 220 of the confirmation of the character code data.

Upon receipt of the confirmation of the character code data with the PC 220, the character code data is inputted to the application software 223 being operated on the PC 220.

Figure 3:
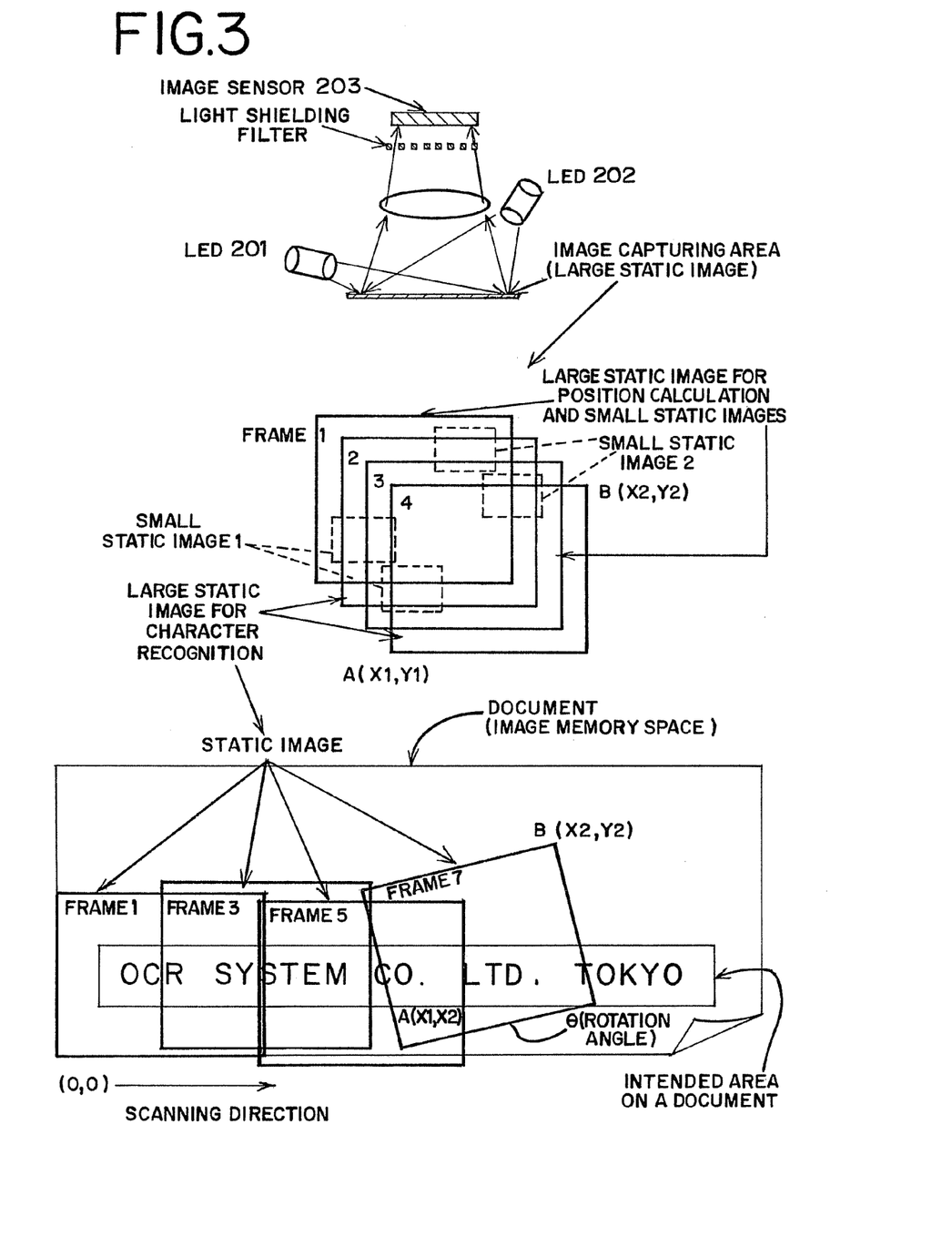
FIG. 3 is a diagram for explaining a method of capturing image data of an intended area on a document with the image scanner.

Now, referring to FIG. 3, a method of capturing image data of an intended area on a document with the image scanner 200 is described. The image sensor 203 of the image scanner 200 is capable of capturing image data at the speed of 30 fps (frame per second). A CMOS having 300,000 picture elements (570×570) in which random accessing to picture elements is possible is used for the image sensor 203. However, the image sensor 203 is not limited to such a random accessible CMOS. Here, the size of an image sensing area of the image sensor 203 is 10 mm×10 mm, so that image data of an image of an area of 10 mm×10 mm on a document (hereinafter referred to as a large static image) is captured with the image sensor 203.

As illustrated in FIG. 3, image data for position calculation, i.e., image data of each of serial static images of an intended area on a document for calculating position information of each of serial static images of the intended area for character recognition, and image data for character recognition, i.e., image data of each of serial static images of the intended area for character recognition, are alternately captured with the image sensor 203 while switching the LED 201 and the LED 202.

A pair of areas of 2 mm square are designated at opposing corners of each large static image for position calculation as predetermined areas (hereinafter referred to as small static images) for calculating position information of each large static image for character recognition, one near a lower left side corner point A and the other near an upper right side corner point B. That is, 12996 picture elements (2×57×2×57) near the corner point A and 12996 picture elements (2×57×2×57) near the corner point B of 300,000 picture elements (570×570) of the image sensor 203 are designated as the areas for calculating position information of each large static image for character recognition.

Position information of each of serial static images (large static images) of an intended area on a document for character recognition, i.e., coordinate values (X,Y) of the center of each large static image and a rotation angle (θ) of the large static image, is calculated based on image data of small static images in large static images for position calculation preceding and following the large static image for character recognition. Specifically, coordinate values of the center of a large static image for character recognition are obtained based on coordinate values of the center of each of large static images for position calculation preceding and following the large static image for character recognition, for example by averaging the coordinate values of the centers of the preceding and following large static images for character recognition. Position coordinates of each small static image are obtained by calculating a moving distance of the small static image with pattern matching thereof with corresponding small static images in preceding and following large static images for position calculation, and coordinate values of the center of each large static image for position calculation are obtained based on the position coordinates of each small static image in the large static image for position calculation. A rotation angle of each large static image for character recognition is calculated based on image data of two small static images in large static images for position calculation preceding and following the large static image for character recognition, specifically with pattern matching of small static images in large static images for position calculation preceding and following the large static image for character recognition. It is necessary that 30%-50% of the total number of picture elements of each small static image is overlapped with picture elements of each of corresponding small static images in preceding and following large static images for position calculation, respectively, to reliably perform the pattern matching. When image data of each of large static images of an intended area on a document is captured at the intervals of 1 mm so that 90% of the large static image (10 mm×10 mm) is overlapped with another large static image, the scanning speed of the image scanner 200 is 33 mm/sec.

Pattern matching may be performed with a residual method (the method of obtaining a difference between a focused pixel and pixels surrounding the focused pixel).

Figure 4:
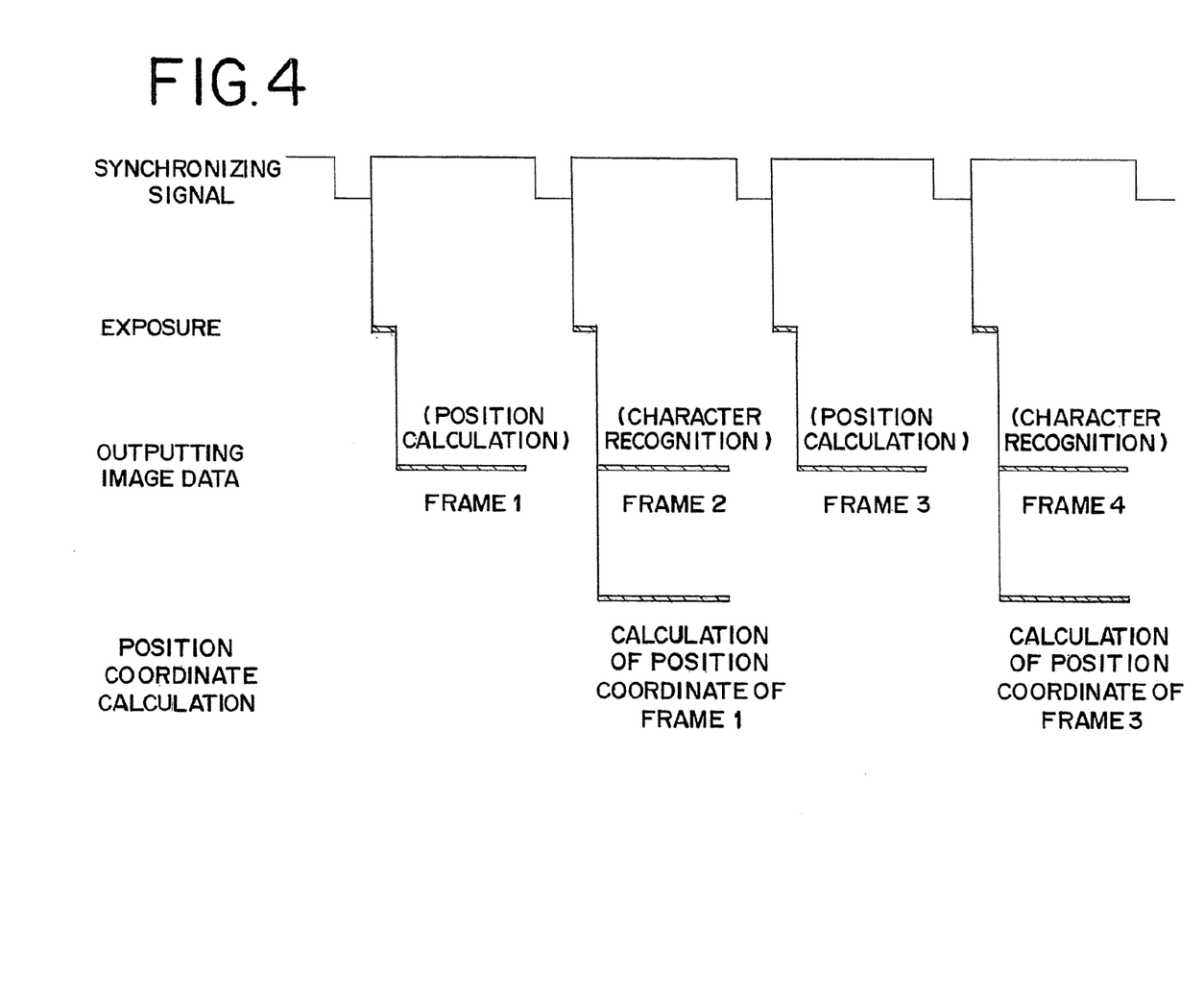
FIG. 4 is a timing chart of capturing image data in the image scanner.

FIG. 4 schematically illustrates timings of capturing image data for position calculation and image data for character recognition and calculating position information of each large static image for character recognition with the image scanner 200. As described above and illustrated in FIG. 4, image data for position calculation (image data of a large static image for position calculation) and image data for character recognition (image data of a large static image for character recognition) are alternately captured with the image sensor 203 while switching the LED 201 and the LED 202. Position information of a large static image for character recognition (in FIG. 4, for example, frame 2) is calculated based on image data of two small static images in each of large static images for position calculation (in FIG. 4, frame 1 and frame 3) preceding and following the large static image for character recognition. Coordinate values of the center of each large static image for position calculation are calculated while image data for character recognition is being captured. For example, as illustrated in FIG. 4, coordinate values of the center of a large static image for position calculation (frame 1) is calculated while image data for character recognition (frame 2) is being captured.

As described above, the image scanner 200 is configured to capture image data for position calculation using the LED 201 that is configured to emit light in a direction substantially parallel to the surface of the document and image data for character recognition with the LED 202 that is configured to emit light in a direction substantially perpendicular to the surface of the document. The reason of using the LED 201 emitting light in a direction substantially parallel to the surface of a document to capture image data for position calculation is to capture image data of a shade pattern on the surface of paper caused by unevenness of the surface of paper. Documents generally include a white area in which no character is printed, and such a white area might be included in small static images in a large static image for position calculation. As described above, image data of small static images in a large static image for position calculation is used for calculating position information of a large static image for character recognition. Specifically, coordinate values of the center of each large static image for character recognition are obtained based on position coordinates of each of small static images in large static images for position calculation preceding and following the large static image for character recognition, and the position coordinates of each of small static images in a large static image for position calculation are obtained by calculating a moving distance of the small static image with pattern matching thereof with corresponding small static images in preceding and following large static images for position calculation. Also, the rotation angle of each large static image for character recognition is calculated with pattern matching of two small static images in a large static image for position calculation with corresponding small static images in preceding and following large static images for position calculation. Therefore, when a white area in which no character is printed exists in a small static image in a large static image for position calculation, a shade pattern on the surface of paper at the white area must be recognized so that image data of the shade pattern can be captured and thereby pattern matching of the small static image with a corresponding small static image is enabled. Thus, the image scanner 200 is configured such that image data for position calculation is captured using the LED 201 emitting light in a direction substantially parallel to the surface of the document and image data for character recognition is captured with the LED 202 emitting light in a direction substantially perpendicular to the surface of the document.

When capturing image data of an image of characters by scanning the image with an image senor, if the image sensor is moved faster than an allowed time, captured image data is distorted, so that character recognition cannot be reliably performed to the captured image. A time allowed for capturing image data with an image sensor without having distortion, which is caused by movement of the image sensor, in the captured image data, is determined based on the resolution of the image sensor and the scanning speed with the image sensor. For example, when capturing image data of an image of kana and kanji characters at the resolution of 16 pixels/mm for performing character recognition to the captured image data, assuming that an allowable moving distance of each picture element for correctly capturing image data is the distance corresponding to about 1/10 of the size of one picture element, the size of one picture element being 0.0625 mm, the allowable speed of capturing the image data is obtained by the formula of (0.0625 mm×0.1)/the scanning speed (mm/sec). For example, when the scanning speed is 100 mm/sec, the allowable speed of capturing image data is 62.5 microsec from this formula.

The scanning speed depends on the speed of capturing image data of a large static image (frame), i.e., the frame speed, and a degree of overlapping of large static images with each other. When the scanning speed is S(mm/sec), the number of frames is F(frames/sec), the overlapping of frames is A(%), the frame size is B(mm) square, and the interval between frames is C(mm), the scanning speed is obtained by the formula; C=B×(1−A) In the image scanner 200, because image data of a large static image (frame) for character recognition is captured alternating with image data of a large static image (frame) for position calculation, the scanning speed is obtained by the formula; S=C×F×0.5.

On the other hand, the suitable resolution for capturing image data of characters and codes for character recognition depends on the type of characters and codes. For example, the resolution of 16 pixels/mm is desirable for capturing image data of kana and kanji characters and the resolution of 8 pixels/mm is sufficient for capturing image data of alphanumeric characters. Therefore, it is desirable that the resolution for capturing image data of an intended area on a document for character recognition can be changed according to the type of characters included in the intended area.

For example, the image scanner 200 may be configured such that image data for character recognition is captured at the resolution of 16 pixels/mm decreased from the resolution of 57 pixels/mm, which is the capacity resolution of the image sensor 203. In this case, the speed of capturing image data is increased from 30 fps to 90 fps. As the result, when overlapping of a large static image with an adjacent large static image is 90%, the scanning speed can be increased from 15 mm/sec to 45 mm/sec. By configuring the image scanner 200 such that image data of alphanumeric characters is captured at the resolution of 8 pixels/mm, the speed of capturing image data is further increased to 150 fps (6.7 ms intervals), and when overlapping of a large static image with an adjacent large static image is 90%, the scanning speed can be increased to 75 mm/sec.

The suitable resolution for capturing image data of a shade pattern on paper also depends on the type of paper. Therefore, depending upon the type of paper, image data for position calculation may be captured at the resolution of 16 pixels/mm or 8 pixels/mm or a lower resolution. When image data for position calculation is captured at a resolution lower than the resolution at which image data for character recognition is captured, calculation of position coordinates of each small static image in a large static image for position calculation can be performed in a shorter time, and thereby position information of each large static image for character recognition can be obtained in a shorter time.

The image scanner 200 may be configured such that the resolutions at which image data for position calculation and image data for character recognition are captured can be switched by manipulation of a switch button (not shown), respectively.

Now referring back to FIG. 2, when a scanning button (not shown) is depressed at the image scanner 200, the LED 201 emits light, and image data of the entire portion of a large static image of an intended area on a document is captured with the image sensor 203 and picture elements of the image sensor 203 are charged. The time required for charging the picture elements is about 60 us. The signal corresponding to each pixel of the large static image is converted to digital data with the A/D converter 207. Image data of two small static images in the large static image is transferred to a DSP memory 211b of the image position calculation (DSP) part 211. Transfer of the image data of two small static images to the DSP memory 211b is completed in about 0.3 ms (60 ns×8 bit×36 pixels×36 pixels×0.5) assuming that the reading speed of the DSP memory 211b is 60 ns. Here, a DSP is used for the image position calculation part 211. However, a logic circuit may be also used for the image position calculation part 211. Then, the LED 202 emits light, and image data of a large static image for character recognition is captured with the image sensor 203. The captured image data is converted to digital data with the A/D converter 207. In converting image data for character recognition to digital data, multi-value data is preferable for achieving satisfactory recognition ratio in character recognition.

The image data of two small static images in the large static image for position calculation transferred to the DSP memory 211b is processed with the DSP 211 and is used in obtaining position information (coordinate values of the center and a rotation angle) of a large static image for character recognition as described above.

Image data of a large static image for character recognition and the coordinate values and the rotation angle thereof calculated with the DSP 211 are temporarily stored in the memory 217.

Image data of subsequent large static images for position calculation and character recognition is captured in a similar manner, and image data and coordinate values and a rotation angle of each large static image for character recognition are stored in the memory 217.

Thereafter, when the volume of image data stored in the memory 217 has reached a predetermined level, each stored image data is transferred to the PC 220 via the USB interface 215 together with position information (coordinate values and a rotation angle) thereof one after another.

By releasing the scanning button, scanning ends.

The image scanner 200 may be configured to display image data of each of serial static images (large static images) of an intended area on a document being captured with the image sensor 203 with the LED display part 213 in real time so that the user can confirm the image data being captured or the position on the document being scanned with the image sensor 203.

The PC 220 receives image data of each of large static images for character recognition and position information thereof transferred from the image scanner 200 with a USB interface 221, and an image data synthesis part 227 as an image synthesis device of the present invention joins the image data of each of large static images for character recognition with each other based on the position information thereof (the position coordinates and the rotation angle), and thereby image data of the intended area on the document is generated. In joining the image data of each of serial static images (large static images) of the intended area for character recognition with each other, the relative positioning and the rotation angle of the each of serial static images for character recognition are determined based on the position information thereof and the portion of the each of large static images for character recognition overlapped with an adjacent large static image is eliminated, so that image data truthfully representing an image of the intended area is generated without having distortion generally caused by movement of the image scanner 200. The generated image data of the intended area is stored in a memory (not shown). When the image position calculation (DSP) part 211 of the image scanner 200 has a reserve calculation capacity and the DSP memory 211b has a reserve memory capacity, the operation of joining image data of each of large static images for character recognition with each other may be performed at the side of the image scanner 200.

Thereafter, a BMP data conversion part 229 coverts the image data of the intended area into that in the BMP format.

The image data of the intended area in the BMP format is then transferred to a character/code recognition part 231 where character recognition is performed to the image data of the intended area with the character recognition software. The character recognition software is configured to operate in the background of application software being operated on the PC 220.

A result of character recognition of the image data of the intended area at the character/code recognition part 231 is transferred to a text file storage part 233 as a temporary storage memory to be temporarily stored. The character recognition result is then transferred to the image scanner 200 via a text input/output part 225 and the USB interface 221.

Thereafter, the character recognition result is displayed on the LCD display part 213 of the image scanner 200, so that the user can check the character recognition result and can input selection of desired characters in displayed candidate characters as necessary. By inputting confirmation of the recognition result with the operation part of the image scanner 200, the character recognition result, i.e., confirmed character code data, is inputted to a cursor location of the application software being operated on the PC 220.

Figure 5:
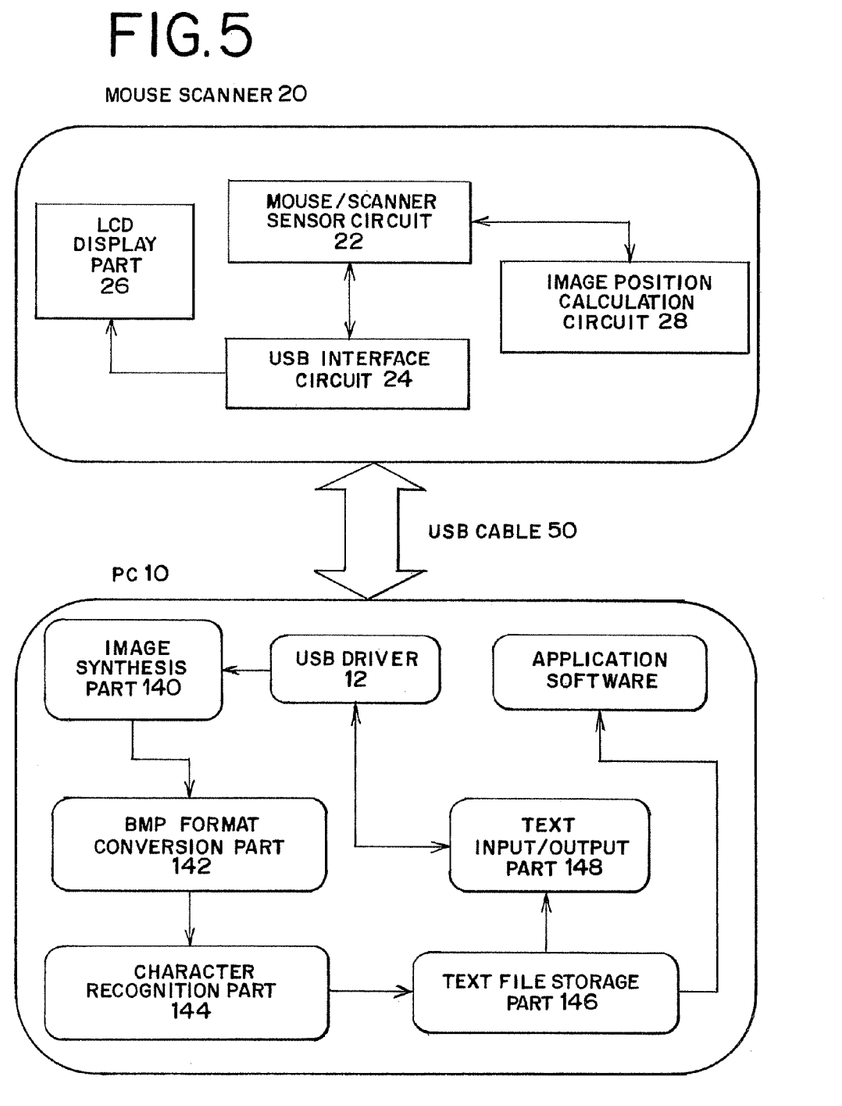
FIG. 5 is a system block diagram of another image processing system including a PC and a mouse scanner according to another preferred embodiment of the present invention.

FIG. 5 illustrates a system configuration of an image processing system including a PC and an image scanner of the present invention. In this example, the image scanner functions as a mouse scanner having a pointing function to a PC.

In FIG. 5, a PC 10 is a popular PC operating under a Microsoft operating system Windows XP (trademark of Microsoft) and having a USB interface.

Application software, such as word processing software, spreadsheet software, and database software, operates in the PC 10, and further, character recognition software operates in the background of the application software. That is, even when the character recognition software is being operated on the PC 10, it appears to the user that only the application software is being operated on the PC 10, and character code data obtained with the character recognition software is inputted to the application software as if the character code data has been inputted to the application software from a keyboard of the PC 10.

Though not illustrated in FIG. 5, a CRT or LCD display and the keyboard are connected with the PC 10. Also, a USB connector is installed in the PC 10, and a mouse scanner 20 is connected with the PC 10 via a USB cable 50. By connecting the PC 20 and the mouse scanner 20 with the USB cable 50, high speed two-way communication between the PC 10 and the mouse scanner 20 is enabled, and power is supplied to the mouse scanner 20 from the PC 10.

The mouse scanner 20 is an apparatus in which a mouse device functioning as a pointing device of the PC 10 and an image scanner optically scanning a document and outputting image data of the document are integrated. The mouse scanner 20 includes an image sensor module 30 (see FIG. 6) and a mouse/image sensor circuit 22 as an image capture device of the present invention, and is configured to move over a document to optically scan the document. By moving the mouse scanner 20 over an intended area on a document to which the user desires to perform character recognition, image data of each of serial static images of the intended area of the document can be captured with the mouse scanner 20.

A USB interface circuit 24 as an input device and an output device of the present invention is configured to transmit the image data of each of serial static images of the intended area on the document captured with the mouse scanner 20 to the PC 10 via the USB cable 50.

A USB driver 12 of the PC 20 is configured to receive the image data and to perform character recognition to the image data with the character recognition software installed in a character recognition part 144. The USB driver 12 transmits character code data as a result of the character recognition of the image data to the mouse scanner 20 via the USB cable 50.

The USB interface circuit 24 of the mouse scanner 20 is configured to receive the character code data and to display characters corresponding to the character code data on an LCD display part 26.

Thus, the result of character recognition performed to image data of an intended area on a document scanned with the mouse scanner 20 can be displayed on the LCD display part 26 of the mouse scanner 20 substantially in real time, so that the user can confirm the result of character recognition of the image data substantially at the same time when the user scans the intended area on the document with the mouse scanner 20. Accordingly, the user can determine an intended area on a document, including the start and end positions of the intended area, and settings in capturing image data of each of serial static images of the intended area (e.g., the threshold level in binarization, etc.) at the time of scanning the document with the mouse scanner 20. Specifically, when designating an intended area on a document, while slightly moving the mouse scanner 20, the start and end positions of an area for character recognition can be confirmed by checking characters displayed on the LCD display part 26, so that if image data of the entire portion of a desired intended area has not been captured with the mouse scanner 20, scanning of the intended area can be performed again at this time.

Further, by installing voice synthesis software in the PC 10, the result of character recognition of image data can be outputted by voice, so that the user can know the result of character recognition of image data without seeing the LCD display part 26.

When a confirmation operation is performed with the mouse scanner 20, the result of character recognition of image data is directly inputted to a cursor location of application software, such as word processing software, spread sheet software and database software, being operated on the PC 10.

At this time, image data of the intended area, the result of character recognition (i.e., character coded data) of which has been inputted to the application software, is displayed on the display of the PC 10, so that the user can easily correct an error in the result of character recognition of the image data inputted to the application software by referring to displayed image data of the intended area. Thus, even if a character recognition error exists in the result of character recognition of image data, the user can easily correct the error by manipulating the keyboard of the PC 10.

The mouse scanner 20 is configured such that captured image data is outputted to the PC 10 in real time without storing the captured image data in a memory.

The mouse/image sensor circuit 22 includes a circuit configured to enable the mouse scanner 20 to function as a pointing device to a computer connected with the mouse scanner 20 and a circuit configured to enable the mouse scanner 20 to capture image data of an image of a document. The mouse/image sensor circuit 22 further includes a position sense circuit configured to utilize position information of each large static image for character recognition of the mouse scanner 20 as position information in the mouse function of the mouse scanner 20. Further, the mouse/image sensor circuit 22 is configured to transmit and receive a control signal to and from the USB interface circuit 24.

The USB interface circuit 24 includes a control circuit configured to control the entire part of the mouse scanner 20 and a USB controller configured to control transmitting and receiving of data to and from the PC 20. Position information of each large static image for character recognition calculated with an image position calculation circuit 28 as an image process device of the present invention is outputted to the USB interface circuit 24 in real time as position information in the mouse function of the mouse scanner 20. When the USB interface circuit 24 receives instructions to start and end scanning and to input confirmation of a result of character recognition from a start button 42 and a confirmation button 44 (see FIG. 6), the USB interface circuit 24 informs such instructions to the mouse/image sensor circuit 22.

Further, when the USB interface circuit 24 has received from the image position calculation part 28 a control data (FFC) to cause the LCD display part 26 to display characters corresponding to character code data received from the PC 10, the USB interface circuit 24 outputs the control data (FFC) to the LCD display part 26. The control data enables characters corresponding to character code data to be displayed on the LCD display part 26.

The USB controller of the USB interface circuit 24 is connected with a USB driver 12 of the PC 10 via a USB cable 50 and is configured to transmit image data captured with the image sensor module 30 (not shown in FIG. 5) and the mouse/image sensor circuit 22 to the PC 10. Further, when the USB controller of the USB interface circuit 24 has received character code data from the PC 10, the USB controller outputs control data to cause the LCD display part 26 to display corresponding characters to the LCD display part 26.

Image data of small static images in each of serial static images (large static images) of an intended area on a document for position calculation captured with the image sensor module 30 and the mouse/image sensor circuit 22 is transferred to the image position calculation circuit 28 so that position information of each of serial static images (large static images) of the intended area for character recognition is calculated based on the image data of small static images in each of large static images for position calculation as described above.

Image data of each large static image for character recognition captured with the image sensor module 30 and the mouse/image sensor circuit 22 is temporarily stored in a memory (not shown) and is transmitted, together with the position information thereof calculated with the image position calculation circuit 28, to the PC 10 by the USB interface circuit 24. The image data of each of large static images for character recognition received by the PC 10 is joined with each other based on the position information thereof as described above with an image synthesis part 140 as an image synthesis device of the present invention, so that image data of the entire part of the intended area is generated. Thus, image data of an image of an intended area on a document truthfully representing the image is obtained with the mouse scanner 20, so that a problem that when image data of an image of an intended area on a document is captured with a portable scanner, the captured image data is distorted due to movement of the portable scanner is avoided, and thereby satisfactory character recognition of the captured image data can be performed.

The PC 10 includes the USB driver 12 in a kernel layer controlled by an OS and a user interface in a user layer controlled by application.

The image synthesis part 140 is configured to join image data of each of serial static images of an intended area (large static images for character recognition) received from the mouse scanner 20 with each other to generate image data of the intended area as described above. A BMP format conversion part 142 is configured to convert the image data of the intended area to image data in the BMP format in real time.

A character recognition part 144 is configured to perform character recognition to the image data of the intended area in the BMP format. Image data received from the mouse scanner 20 is thus converted to character code data.

A text file storage part 146 is configured to temporarily store the character code data. A text input/output part 148 is configured to transmit the character code data to the mouse scanner 20 via the USB driver 12 while converting the character code data to LCD data substantially in real time. Thus, image data of an intended area on a document captured by scanning the intended area with the mouse scanner 20 is converted to character code data with the PC 10 in real time and the character code data is displayed on the LCD display part 26 of the mouse scanner 20 substantially at the same time when the intended area is scanned with the mouse scanner 20.

Figure 6:
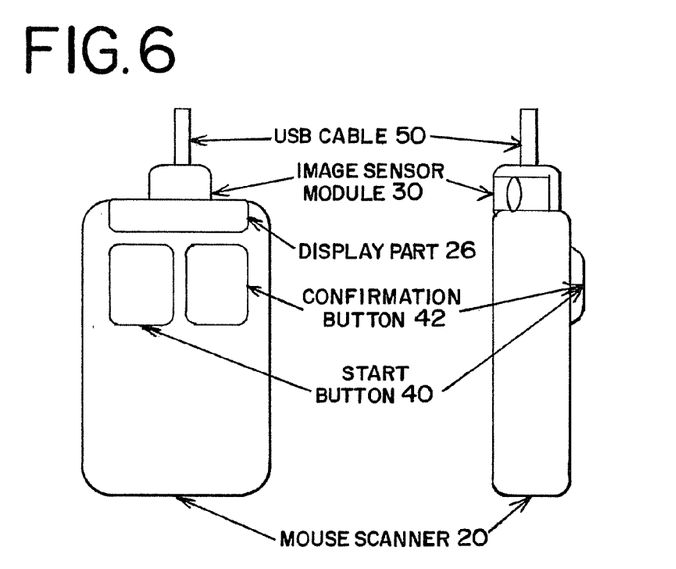
FIG. 6 is a plan view of an upper surface of the mouse scanner and a side view of the mouse scanner.

FIG. 6 illustrates an outer appearance of the mouse scanner 20. The image sensor module 30 includes a light source, a non-spherical lens and an image sensor, which are integrated with each other, and the mouse/image sensor circuit 22 inside thereof. The image sensor module 30 is arranged at a part of the mouse scanner 20 where the USB cable 50 is connected so that the position on a document being scanned with the mouse scanner 20 can be easily seen.

Further, the LCD display part 26, a start button 40, and a confirmation button 42 are arranged at an upper surface of the mouse scanner 20. The user depresses the start button 40 to start and end scanning and the confirmation button 42 to input confirmation of characters being displayed on the LCD display part 26.

Selection between capturing image data of image such as photos and capturing image data of characters and selection of a type of languages (e.g., Japanese or English) and various codes can be performed either at the PC 10, or at the mouse scanner 20 with manipulation of a button (not shown), or can be performed at both of them. Also, setting of resolutions for capturing image data of each large static image for character recognition and image data of each large static image for position calculation can be made either at the PC 10, or at the mouse scanner 20 with manipulation of a button (not shown), or at both of them.

When capturing image data of images (e.g., photos) to which the user does not desire to perform character recognition, the image data is preferably captured at a decreased resolution, e.g., 16 pixels/mm or 8 pixels/mm, so that the time required for performing pattern matching of small static images is decreased. As described above, 30%-50% of the total number of picture elements of each small static image of 2 mm square in a large static image for position calculation must be overlapped with picture elements of each of corresponding small static images in preceding and following large static images for position calculation, respectively, to reliably perform the pattern matching between them. Image data of each large static image must be captured at the intervals of 1 mm to obtain such overlapping of each small static image. When the scanning speed of the mouse scanner 20 is assumed to be 30 mm/sec, image data of each of large static images is captured at the intervals of 1 mm (33 ms). At this time, each small static image being 2 mm square, the above-described overlapping of 50% of the small static image is provided. When image data of each small static image is captured at the resolution of 57 pixels/mm, the total number of overlapped pixels in the small static image is 6498 pixels (2×57×2×57× 0.5). By decreasing the resolution for capturing image data of each small static image in a large static image for position calculation to 16 pixels/mm or 8 pixels/mm, the total number of pixels used in pattern matching of the small static image can be decreased.

When capturing image data of an image with the mouse scanner 20, before starting the capturing, selection between capturing image data of images such as photos and capturing image data of characters and setting of a resolution for capturing image data are made by the user, and thereby the operation described in FIG. 1 is performed. The mouse scanner 20 can be moved in random directions over a document to capture image data of images such as photos on the document unlike when capturing image data of characters generally printed on the document in vertical or lateral direction.

In the above-described embodiments, a CMOS sensor in which random accessing to picture elements is possible is used for the image scanner 200 and the mouse scanner 20. A CCD in which random accessing to picture elements is not possible can be also used for the image scanner 200 and the mouse scanner 20. For example, an interline type CCD, which is widely used in digital cameras, can be used. The interline type CCD enables the whole picture elements to capture image data individually with an exposure using an electronic shutter and without using a mechanical shutter. The interline CCD is constructed such that pitches between picture elements are the same in the vertical and lateral directions, so that the resolutions are the same in the vertical and lateral directions. In an interline CCD having 330,000 picture elements (659×494), for example, one picture element is 7.40μ vertically and laterally, the diagonal length is 6.0 mm (⅓ type), the data capture frequency is 24.54 MHz (41 ns), and the frame rate is 60.0 fps. When the size of a large static image is 10 mm×10 mm, the frame rate being 60 fps, it takes 16.6 ms to capture data of the whole picture elements of each large static image.

When such an interline type CCD is used for the image scanner 200 and the mouse scanner 20, because capturing only image data of a designated area, that is possible in a random accessible CMOS, is not possible, image data at consecutive addresses in each large static image for position calculation is used for image data for calculating position information of each large static image for character recognition. For example, rectangular areas of 0.5 mm×10 mm in a large static image of 10 mm×10 mm are designated as small static images in the large static image. Image data of each area of 0.5 mm×10 mm starting from the first address and the last address in each large static image for position calculation is sequentially captured and transferred to a memory as image data of small static images of each large static image for position calculation, and position coordinates of each of the areas as small static images are calculated based the image data of the areas.

Image data of each large static image for character recognition may be captured at a decreased resolution so that the number of pixels of the large static image is compressed. For example, when the resolution of a CCD is 57 pixels/mm, image data of each large static image for character recognition may be captured at the resolution decreased by one third so that the number of pixels of each large static image for character recognition is compressed by one third from 659×494 to 220×165.

Now referring back to FIG. 2, again, when the scanning button (not shown) is depressed at the image scanner 200 using such an interline type CCD, the LED 201 emits light, and image data of a large static image of an intended area on a document for position calculation is captured with the image sensor 203. The signal corresponding to each pixel of the large static image is converted to digital data with the A/D converter 207. Image data of each of two rectangular areas (0.5 mm×10 mm) as small static images in the large static image is transferred to the DSP memory 211b as described above. Then, the LED 202 emits light, and image data of a large static image for character recognition is captured with image sensor 203, captured image data is converted to digital data with A/D converter 207, and the image data for character recognition is transferred to the digital image memory 217. At this time, as described above, compressed image data of the large static image, i.e., image data of the large static image at a decreased resolution, is transferred to the digital image memory 217.

The image data of small static images transferred to the DSP memory 211b is processed with the image position calculation part (DSP) 211. Specifically, coordinate values of the center of each of small static images in each large static image for position calculation are calculated during the time image data of a large static image for character recognition is captured as described above.

When the volume of image data stored in the digital image memory 217 has reached a predetermined level, image data of each large static image for character recognition is transferred one after another together with position information thereof (coordinate values of the center and the rotation angle of the large static image) to the PC 220 via the USB interface 215.

The processes at the PC 220 are substantially the same as those of the previous embodiment, so that the description thereof is omitted.

In the above example, image data of two rectangular areas of 0.5 mm×10 mm in each large static image for position calculation starting from the first address and the last address is sequentially captured as image data of small static images of each large static image for position calculation. However, image data of rectangular areas of any size starting from designated addresses may be captured as image data of small static images of each large static image for position calculation. Further, the image data of such areas may be captured at a decreased resolution as necessary.

Figure 7:
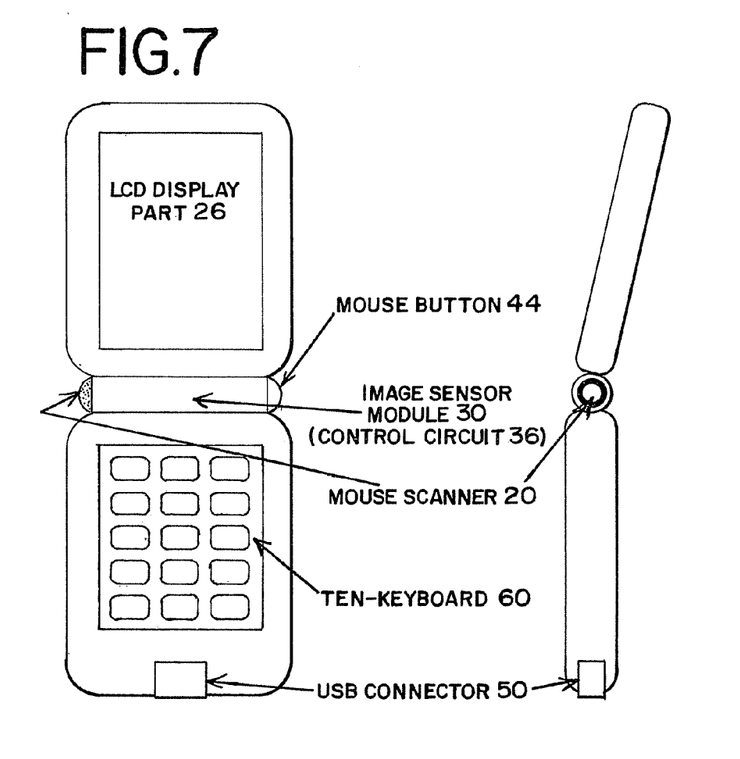
FIG. 7 is a schematic diagram of a mobile phone incorporating the mouse scanner.

FIG. 7 illustrates a mobile phone as an optical terminal apparatus according to another preferred embodiment of the present invention. The mobile phone incorporates the mouse scanner 20, so that the mobile phone can be used as a mouse scanner for a portable PC. Further, when the mobile phone has an extra processing capacity, the mobile phone may be configured to perform character recognition. The mobile phone may be also configured to transmit captured image data to a server via a wireless public switch circuit.

The mouse scanner 20 includes the image sensor module 30 including the mouse/image sensor circuit 22 inside thereof and a control circuit 36 corresponding to the USB interface 24 and the image position calculation circuit 28 of FIG. 5. The image sensor module 30 includes a light source, a non-spherical lens and an image sensor, which are integrated with each other. The image sensor module 30 is arranged at a position where the user can easily see the position being scanned with the mouse scanner 20. The mobile phone also includes the LCD display part 26 and a mouse button 44.

Selection between capturing image data of images such as photos and capturing image data of characters and selection of a type of languages (e.g., Japanese or English) and various codes can be performed either at the portable PC, or at the mouse scanner 20 with manipulation of a button (not shown) provided to the mouse scanner 20, or can be performed at both of them.

Image data captured with the portable phone in substantially the same manner as described above with respect to FIG. 6 can be transferred to the portable PC connected via the USB connector 50, and a result of performing character recognition to the image data with the portable PC can be displayed on the LCD display part 26 of the mobile phone also in substantially the same manner as described above with respect to FIG. 6. The image sensor module 30 of the mouse scanner 20 can be commonly used for a camera function of the mobile phone. Further, image data obtained with the mouse scanner 20 can be stored in an external memory device of the mobile phone, such as a SD memory card, a memory stick, etc., or can be transmitted to a remote server using a wireless communication function of the mobile phone. Furthermore, when the microcomputer of the mobile phone has an extra capacity, by installing character recognition software in the mobile phone, character recognition of obtained image data can be performed at the mobile phone.

Figure 8:
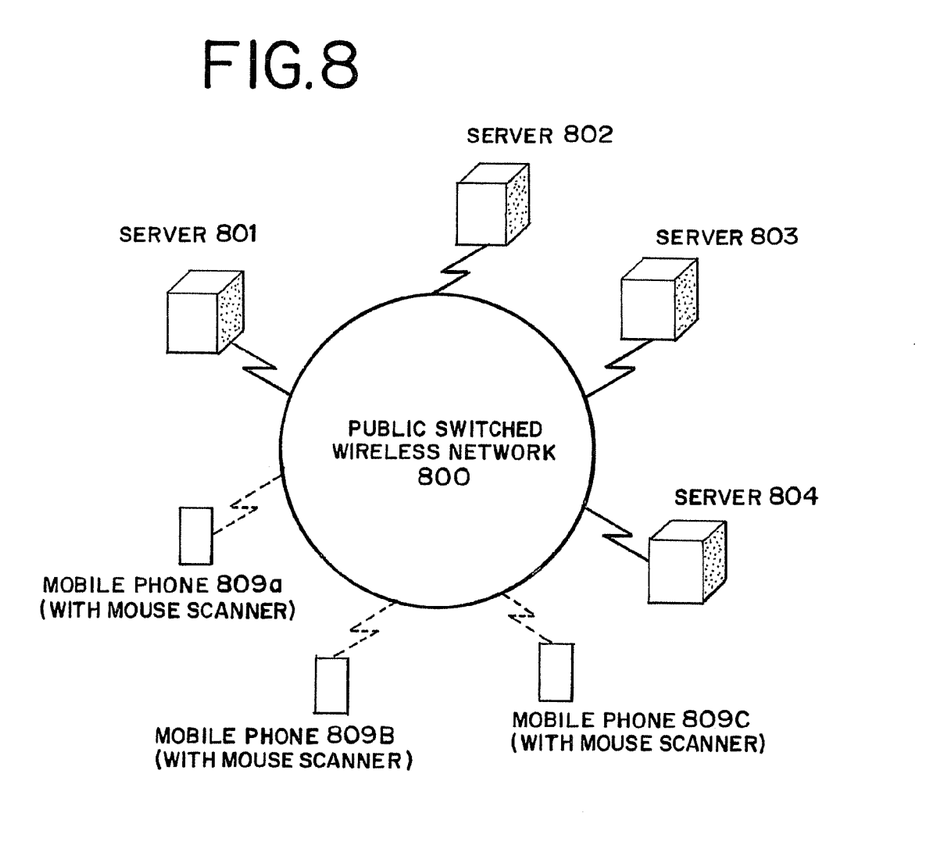
FIG. 8 is diagram of a network system in which the mobile phone incorporating the mouse scanner is used in accessing various servers.

FIG. 8 illustrates an Internet service system using the above-described mobile phone incorporating the mouse scanner 20. Image data obtained with the mouse scanner 20 of each of mobile phones 809a, 809b and 809c is transmitted to servers 801, 803, 805, and 807 using a wireless communication function of each mobile phone, where the image data is processed for providing various services to each of the mobile phones 809a, 809b and 809c.

For example, the server 801 may be configured to provide a translation service for foreign tourists. When image data obtained with the mouse scanner 20 of the mobile phone 809a is received from the mobile phone 809c for example, the server 801 converts the image data to character code data with character recognition as described above, and thereafter the server 801 translates the character code data to that of a requested language and the translated character code data is transmitted to the mobile phone 809a.

Further, the server 803 may be configured, for example, to provide a service to access a mail order house according to received image data. The user transmits, for example, image data of a catalogue or an ad on a newspaper obtained with the mouse scanner 20 of the mobile phone 809b to the server 803. The server 803 performs character recognition to the received image data to obtain a product coded, etc., and thereafter accesses the mail order house for inquiry, order, etc.

The server 805 may be configured, for example, to provide a service of inputting and accessing addresses of various services of national and local governments. The user simply scans image information of such addresses with the mouse scanner 20 of the mobile phone 809c for example, and transmits obtained image data to the server 805, so that inputting of various addresses is facilitated.

The server 307 may be configured, for example, to provide a service of accessing home appliances such as a TV set and a video recorder via the Internet from the mobile phones 809*a*, 809*b* and 809*c*. For example, inputting of G codes of TV programs to a video recorder at home from outside can be facilitated using the mobile phones 809*a*, 809*b* and 809*c* incorporating the mouse scanner 20.

Obviously, numerous additional modifications and variations of the present invention are possible in light of the above teachings. It is therefore to be understood that within the scope of the appended claims, the present invention can be practiced otherwise as specifically described herein.

What is claimed is:

1. An image processing terminal apparatus comprising: an image capture device having a first light-emitting element emitting light from above in a direction substantially perpendicular to a surface of a document when capturing image data of an intended area, a second light-emitting element emitting light in a direction substantially parallel to the surface of the document when capturing a small image area, and an image sensor comprising a first area and a second area, wherein the first area captures a plurality of large image information by optically motion-scanning the document with the first light-emitting element, and the second area captures small image information selected from at least two predetermined areas with respect to the plurality of large image information by optically motion-scanning the document with the second light-emitting element;

an image process device configured to calculate relative position coordinates by referring to the small image information captured in the second area of the image sensor in the image capture device; and an output device configured to output the position information of the small image area resulting from the calculation in the image process device and the corresponding large image information.

2. The image processing terminal apparatus according to claim 1, wherein a resolution of the small image area where position coordinates are calculated is different from a resolution of the large image information.

3. The image processing terminal apparatus according to claim 1 or 2, further comprising:

a display device; and an input device configured to input data from an external computer, wherein the large image information is outputted from the output device to the computer for character recognition at the computer according to entire image data that has been formed based on the position information data, and a result thereof is inputted to the input device to be displayed on the display device.

4. The image processing terminal apparatus according to claim 3, wherein the display device displays the large image information while scanning the image.

5. The image processing terminal apparatus according to claim 1, wherein the apparatus is connected with the computer via wired means such as a high-speed bidirectional communication bus or via wireless means such as optical communication or radio wave and used as a pointing device.

6. The image processing terminal apparatus according to claim 1, wherein the apparatus is incorporated into a mobile phone and connected with a server via wireless public switched telephone network of the mobile phone to send the large image information and a position information of the small image obtained in the image processing terminal device to the server.

7. A method of image processing in an image processing terminal apparatus, wherein an intended area on a document is motion-scanned by using the image processing terminal apparatus, comprising the steps of:

emitting light by a first light-emitting element from above in a direction substantially perpendicular to a surface of a document when capturing image data of an intended area;

emitting light by a second light-emitting element in a direction substantially parallel to the surface of the document when capturing a small image area;

capturing a plurality of large image information into a first area of an image sensor in an image capture device by optically motion-scanning the document with the first light-emitting element and capturing small image information selected from at least two predetermined areas with respect to the plurality of large image information into a second area of the image sensor in the image capture device by optically motion-scanning the document with the second light-emitting element;

processing image by calculating relative position coordinates by referring to the small image information captured in the second area of the image sensor in the image capture device; and outputting the position information of the small image area resulting from the calculation in the image process device and the corresponding large image information.

* * * * *